May 14, 1963    E. N. CONNOY ETAL    3,089,945
BAND SAW BLADE STOCK AND METHOD OF MAKING THE SAME
Filed Nov. 7, 1960    2 Sheets-Sheet 1
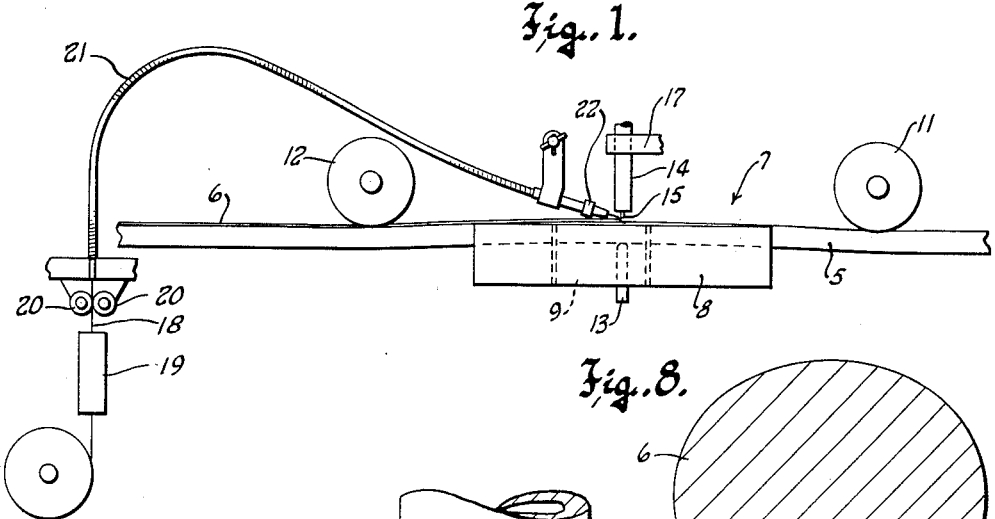
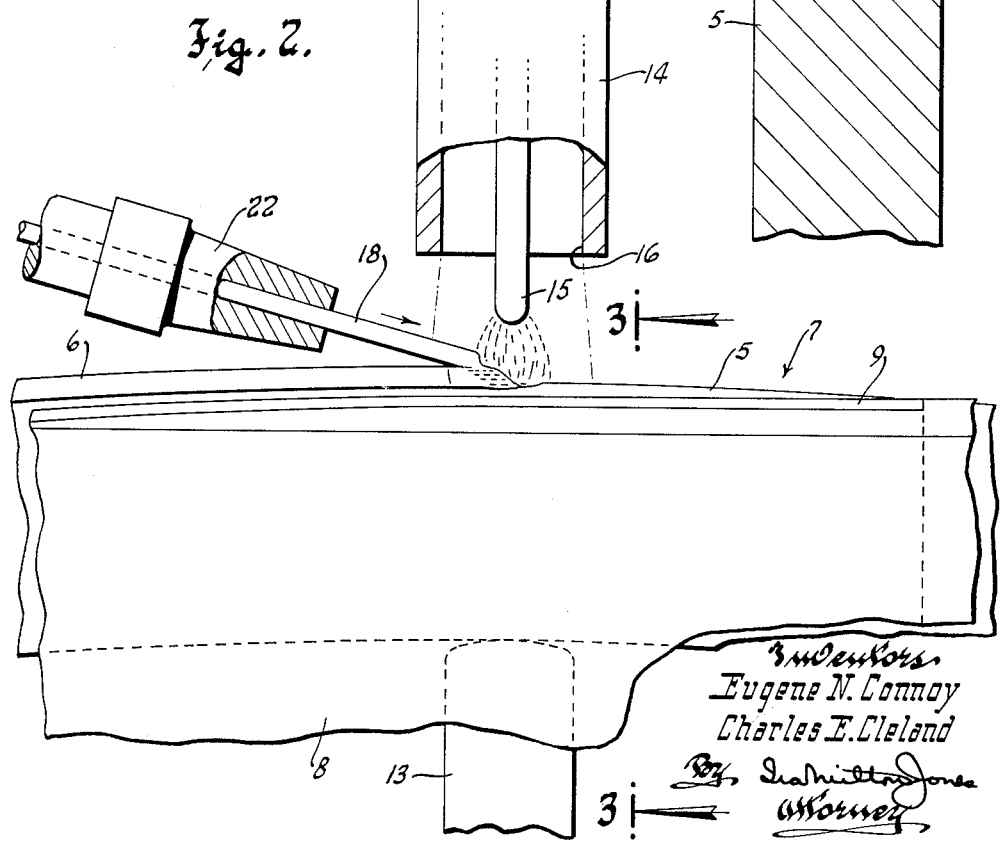
Inventors
Eugene N. Connoy
Charles E. Cleland

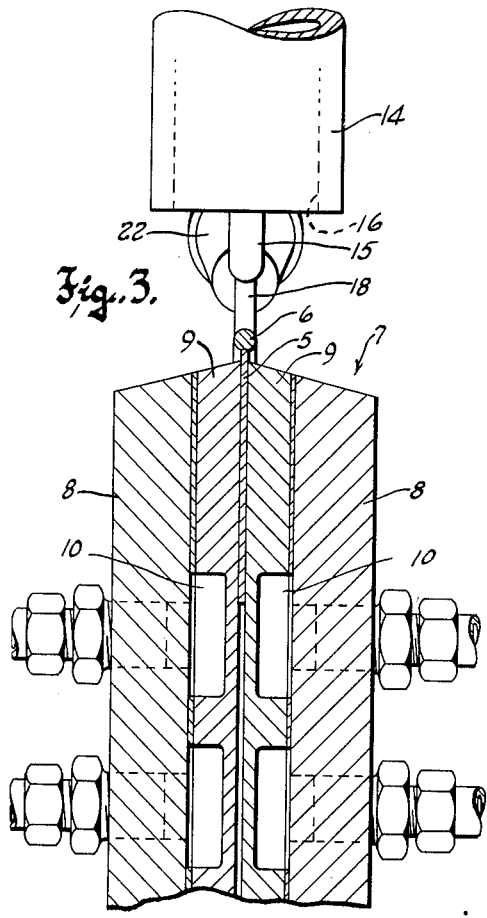
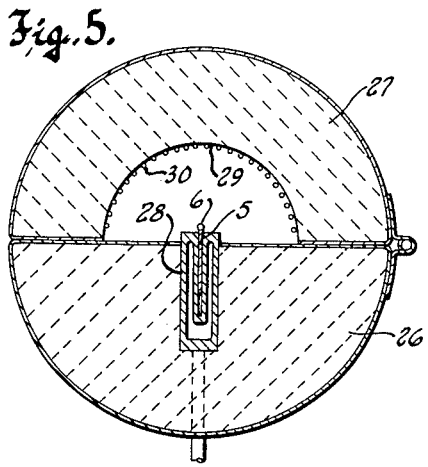
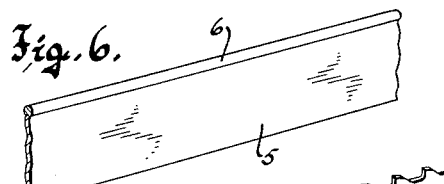
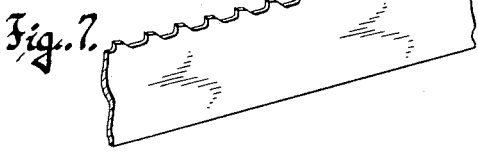
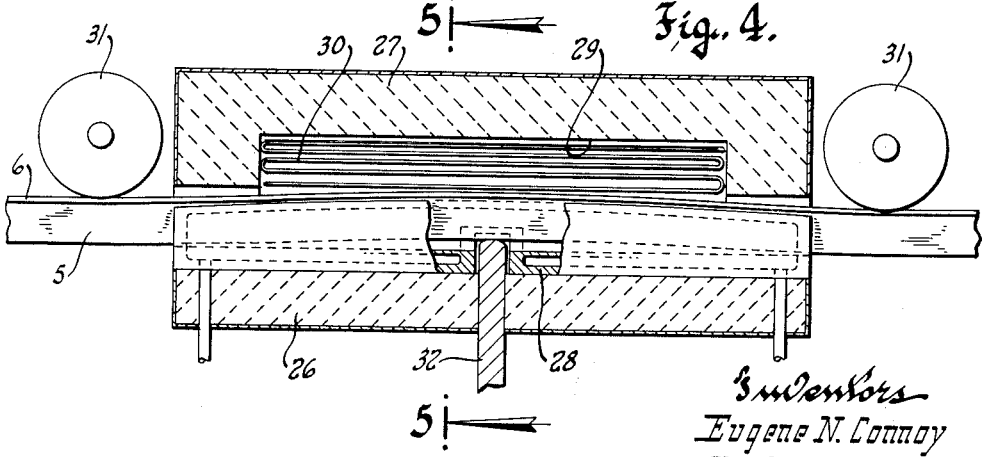

United States Patent Office 3,089,945
Patented May 14, 1963

3,089,945
BAND SAW BLADE STOCK AND METHOD
OF MAKING THE SAME
Eugene N. Connoy and Charles E. Cleland, Minneapolis,
Minn., assignors to Continental Machines, Inc., Savage,
Minn., a corporation of Minnesota
Filed Nov. 7, 1960, Ser. No. 67,654
14 Claims. (Cl. 219—76)

This invention relates broadly to the art of making metal cutting band saw blades, and has as its purpose to provide an improved band saw blade and, more specifically, to provide a better and more practical way of making good band saw blades.

It is, of course, common knowledge that for years the art has been seeking to improve band saw blades. Many different approaches to this problem have been tried, but every significant step in the right direction began with the recognition that a successful band saw blade must have extremely hard, wear resistant cutting points or tips on its teeth, and a back which is highly resistant to fatigue failure, and capable of withstanding great shock.

The band saw blade and method of making it which forms the subject matter of the pending application of Eugene N. Connoy, Serial No. 846,734, filed October 15, 1959, is an outstanding example of a step in the right direction. The band saw blade of that pending application has a tough, resilient back and high speed steel cutting points formed on and joined to the teeth in a way which gives the blade unprecedented performance. But the way the high speed steel is applied in that method of making the saw blade entails an intermittent stepwise operation, which is obviously not as practicable and desirable from a production standpoint as a continuous operation.

The primary purpose and object of this invention is, therefore, to provide an improved method of applying a selected cutting tool steel to a backing band of steel possessing the properties necessary to withstand shock and have good resistance to fatigue failure, and more particularly to provide a method which lends itself to a continuous operation as distinguished from an intermittent operation.

This invention further contemplates an entirely new approach in the art of making band saw blades. Hereto fore, all band saw blades in which the points of the teeth were much harder than the body of the teeth and the back of the blade, had the teeth cut or formed in the band before the points were hardened or provided with hard tips. Consequently, any given band undergoing treatment to harden the points or tips of its teeth had an established pitch. Even the very successful method of the aforesaid pending Connoy application is geared to the production of band saw blades of given pitch.

With a view to obviating this constraint of predetermined pitch upon the manufacturer of band saw blades, the present invention has as another of its objects to provide what might be considered pitchless band saw blade stock, into which teeth of any size or shape or pitch may be subsequently cut, with the assurance that the points or tips of all of the teeth will be formed of the selected cutting tool steel.

The term "cutting tool steel" as used herein covers any of the steel alloys normally used for cutting tools. Thus in includes high carbon steel, high carbon steel alloys, high speed steel, and semi high speed steel. The selection depends simply upon the intended use of the saw blade to be made from the band saw blade stock. Thus, for instance, ordinary high carbon steel could be used for making a blade to cut aluminum, but high speed steel would be used for making blades intended for cutting materials that have such high resistance to being cut that the tooth tips become heated to red heat at commercially feasible cutting rates.

The method of making the saw band blade stock of this invention comprises moving a band of steel possessing the properties necessary to withstand shock and have good resistance to fatigue failure, continually and at a uniform rate lengthwise along a defined path. This may be done by feeding the steel band from a coil thereof, between one or more pairs of rollers, which grip the sides of the band and advance it.

As the band is thus moved endwise along a defined path, it passes a concentrated heat source, so positioned with respect to the path of the band that one edge of the band has its surface portion brought to the fusion temperature as it passes the heat source. Although any suitable way of providing the concentrated heat source may be employed, it is preferable to use a "Heliarc" type welder in which a tungsten rod provides a "hot" electrode. This electrode is connected to one terminal of a source of welding current and the steel band is connected to its other terminal. In operation an arc is drawn between the end of the electrode and the edge of the steel band, and this arc melts the contiguous surface portion of the band.

Since it is important that only the very edge portion of the steel band be brought to its fusion temperature, heat must be quickly abstracted from all but this edge portion of the band. This may be done by having the band slide between a pair of suitably cooled quench jaws with only about $\frac{1}{16}$ of an inch of its edge portion exposed. The quench jaws, of course, should be located in juxtaposition to the heat source.

As the arc melts the advancing edge portion of the band, the selected cutting tool steel is continually fed into the arc to be melted thereby and deposited on the molten edge of the band. The cutting tool steel is preferably fed into the side of the arc in the form of a wire or rod which is advanced along a path fixed with respect to the path of the band, at a rate such that the quantity or volume of cutting tool steel deposited and fused to the edge of the steel band is sufficient to produce a continuous bead of cutting tool steel on the band, with the bead substantially round in cross section and of a diameter approximately twice the thickness of the band.

For successful practice of the invention, it is important to keep the volume of the metal in the molten state to a minimum. If this volume is allowed to become too large, surface tension will cause the molten "cylinder" to pull in from both its upstream and downstream ends and form a ball or sphere; therefore, the faster the molten bead can be quenched and solidified, the better. Accordingly, the quench jaws, or other means employed to draw heat from the band should be particularly effective directly downstream of the arc; and the abstraction of heat effected thereby should be fast enough to assure solidification of the formed, though still molten end portion of the cutting tool steel bead before surface tension can disrupt the continuity of the bead.

Passing the band between quench jaws to abstract the heat from the formed though still molten portion of the high cutting tool bead, has the advantage of protecting the steel band against loss of temper which would occur if the steel were allowed to become too hot.

Although properly designed quench jaws may be sufficient to assure the desired rapid solidification of molten cutting tool speed steel, it has been found that the placement of the cutting tool steel wire or rod as it approaches the arc can be of great help in this respect. Thus by feeding the wire or rod along a path which closely overlies the freshly formed bead, the wire or rod shields the molten portion of the bead against direct radiation from the arc and thereby hastens solidification of the molten portion of the bead. In addition, if the unmelted advancing wire or rod also passes through or at least is in contact with the molten portion of the bead, the wire or rod is desirably preheated and the molten puddle downstream from the melting area is cooled.

Best results have been obtained when the steel band moves along a horizontal path and the cutting tool steel wire or rod is advanced along a path directly above and in line with the upper edge of the steel band at an angle of between five and fifteen degrees to the edge of the band, and with the end of the wire or rod dipping into the molten puddle just as it enters the arc.

Any suitable way of feeding the cutting tool steel wire or rod to the arc may be employed, provided that the rate of feed can be accurately controlled and maintained uniform and that the path of the wire or rod as it approaches the arc can be adjusted and held at a specified angle and location with respect to the top edge of the band.

Though the described path of the wire or rod establishes the fact, for sake of emphasis it is desired to point out that the wire or rod moves in a direction opposite that of the advancing band. This is contrary to what might be normally expected, but as has been shown, the resulting positional relationship between the wire or rod and the band brings about certain very beneficial results.

The specific means employed to feed and guide the wire or rod to the arc, to a degree at least, is a matter of choice. One way of doing so consists in providing the cutting tool steel in the form of wire wound upon a spool, drawing the wire from the spool and through a wire straightener by means of friction rollers, and then by means of these same friction rollers, pushing the wire through a flexible sheath, the mouth of which consists of a copper or other non-ferrous metal tube to preclude fusion of the steel thereto.

It is a characteristic of this invention that the cutting tool steel bead formed on and fused to the edge of the steel backing band in the manner described, has an exceptionally fine grain structure which is entirely free from any evidence of cold working. The extremely rapid quenching of the molten steel may explain why and how this desirable result is obtained.

Another characteristic of the invention is that, although the bead of cutting tool steel is in effect cast on the edge of the band, no casting mold is employed. Controlled surface tension alone is relied upon for this purpose.

By the method thus far described, a continuous uniform cross section bead of a selected cutting tool steel can be fused onto one edge of a band of steel, such as S.A.E. 6150, with the junction therebetween so secure that when teeth are subsequently cut through the bead and into the adjacent edge of the steel band, the resulting cutting tool steel points or tips of the teeth will not break off even under severe impact. However, unless steps are taken to prevent it, the resulting composite band will have considerable camber and will be anything but straight. This follows from the fact that when any metal band, even one of the same material throughout, has only one edge thereof heated and cooled, camber—i.e. edgewise curvature—is inevitable. As the edge is heated, thermal expansion of the heated edge portion bends the band edgewise and, in doing so, sets up stresses therein which, due to the weakened structure of the heated metal, cause the heated edge portion to undergo a structural change. The heated edge portion actually fails in compression. Hence, upon subsequent cooling, it is impossible for this edge portion of the band to return to its original state.

With the addition of the cutting tool steel bead on the heated edge, the problem is further complicated, for almost any cutting tool steel, and especially high speed steel, has a coefficient of expansion which is substantially lower than that of S.A.E. 6150 steel. To produce a composite band of this type which will be straight when it is completed, therefore, is difficult, to say the least. Of course, an attempt could be made to remove the camber after the composite band has been completed, but obviously it is far better to prevent the camber, if possible. With this invention, it is possible to do so.

The solution to the problem lies in stretching the edge of the band to which the cutting tool steel bead is fused, before it is heated. This is most easily done by bowing the steel band edgewise, to thereby introduce therein what might be considered pre-camber, the stretched edge naturally being the convex edge. Because of the stretched condition of the convex edge, the thermal expansion incident to the heating thereof, is, in effect, accommodated without the introduction of destructive compression forces. Therefore, when the band cools, it returns to its original straight condition.

Obviously, of course, the amount of the camber must be correctly chosen to assure the desired result. Where the band is wholly of one type of steel, so that its coefficient of expansion is the same in all parts thereof, the extent of pre-camber needed might be determined mathematically, but when a bead of some other steel fused to one edge of the band, also must be taken into account, the many factors involved are so complex that no way is known for predetermining the amount of camber that should be employed. However, it is not too difficult to determine the correct camber empirically.

As an example of the extent of camber that may be needed for an S.A.E. 6150 steel band thirty five-thousandths of an inch thick and two inches wide, a pre-camber which results in an arc one-half inch high at the center of a chord four feet long will produce satisfactory results.

The means employed to introduce the pre-camber in the steel band may consist of a pair of spaced apart top supports or rollers which engage the top edge of the band, and a single bottom support which bears against the lower concave edge of the band midway between the two top supports. All of the supports are preferably adjustable since this makes it easier to control the path of the band, though, of course, the needed adjustment can be obtained by having only the bottom support adjustable.

After the cutting tool steel bead is fused to the steel backing band, the resulting product may be coiled and put away for future conversion into saw blades. However, it is normally desirable to temper the cutting tool steel, and if this is high speed steel it is definitely desirable to temper it to bring about secondary hardness, so that when teeth are subsequently cut in the edge of the band having the high speed steel bead, to produce a band saw blade, the blade will be capable of cutting at red heat.

The tempering is done by moving the band lengthwise through an elongated muffle in which a predetermined temperature is maintained, in such a way that only the high speed steel bead is heated, while the rest of the band is kept cool to preclude loss of any of its attributes.

In passing through the muffle, the band is again bowed edgewise to stretch its edge to which the bead is fused. Through adjustment of the camber thus imparted to the band as it is undergoing the heat treatment, straightness of the band upon cooling is assured.

It has been found that a muffle four feet long and a temperature of 1375° in the muffle, will produce the desired results with the band travelling between two and four feet per minute. By regulating the speed of the band through the muffle, the tempering of the high speed steel can be made to follow any typical high speed steel tempering curve; and it is noteworthy that with this method the tempering of the high speed steel is accomplished in a matter of minutes, as compared to several hours required with prior tempering methods.

After the steel of which the bead is formed has been tempered, the saw band blade stock is complete. Now it may be coiled up and put away for future conversion into band saw blades with assurance that the teeth will have the finest cutting edges or tips available. The conversion requires merely grinding the sides of the bead to flatness flush with the faces of the band, and the grinding of teeth into the edge portion of the band along which the bead has been formed. Whether the sides of the bead are ground first, or the teeth are first cut and then the sides ground, is a matter of choice, which may be resolved upon purely economic considerations. In any event, when the teeth are cut or formed, their points or tips consist of the selected cutting tool steel. Preferably the cutting tool steel constitutes only one-third to one-half of the overall tooth height. This assures against breakage of the teeth during the setting thereof, which may be done in any conventional manner.

Although it is probably not necessary for an understanding of this invention, for the sake of completeness of disclosure, it is pointed out that the steel used for the back of the saw band and to which the cutting tool steel bead is fused, may be any one of the four types of steel identified by the following AISI-SAE numbers or similar steels: 6150; 1060; 9254; 9261.

The typical analyses of these steels are as follows:

|            | AISI-SAE 6150 | AISI-SAE 1060 | AISI-SAE 9254 | AISI-SAE 9261 |
|------------|---------------|---------------|---------------|---------------|
| Carbon     | .48/.53%      | .55/.65%      | .50/.60%      | .55/.65%.     |
| Manganese  | .70/.90       | .60/.90       | .50/.80       | .75/1.00.     |
| Phosphorous| .040 max      | .040 max      | .040 max      | .040 max.     |
| Sulfur     | .040 max      | .050 max      | .040 max      | .040 max.     |
| Silicon    | .20/.35       |               | 1.20/1.60     | 1.80/2.20.    |
| Chromium   | .80/1.10      |               | .50/.80       | .10/.25.      |
| Vanadium   | .15 min       |               |               |               |
| Iron       | Bal.          | Bal.          | Bal.          | Bal.          |

The 6150 steel with a hardness of 40 to 50 Rc., has been found to be entirely satisfactory.

The cutting tool steel of which the bead is formed, as noted before, may be 1095 high carbon steel, any of the high carbon steel alloys, semi-high speed steel identified as the L-100 type, or any one of a wide variety of high speed tool steels, all of which have the common functional attribute of maintaining hardness at high temperatures, i.e. in the neighborhood of 1000° F., in addition to high structural strength and the other qualities of good tool steel. These high speed steels are broadly divided into two basic types—the M type and the T type, the M and the T signifying, with a few exceptions, the major alloying elements entering into their composition—namely, molybdenum and tungsten. The steel industry has standardized on the composition of a number of these high speed steels, and the following table identifies some of them by their letter and number symbols and gives the analysis of each:

though having a dendritic-austenitic structure, possesses the functional attributes of steel used for fine high speed metal-cutting tools. Its hardness is 63–66 Rc. before tempering to secondary hardness, and thereafter will be as high as 67 Rc. It is not brittle, but, on the contrary, malleable to a degree and, as already pointed out, can not be broken off the tooth on which it is formed even by heavy impact loads.

As noted hereinbefore, the steel band to which the high speed steel edge is fused must possess the properties necessary to withstand shock and have good resistance to fatigue failure; and, of course, the band must be sufficiently flexible to permit rapidly recurring bending or flexure thereof through 180° as the band (i.e. the finished saw band) travels over the band wheels or pulleys of a band saw. To meet these requirements, the band must have the properties and hardness of good spring steel.

Any one of the four steels hereinbefore mentioned for use as the band material, hardened and tempered to a hardness between 40–50 Rc., will satisfy the requirements; and since the method of this invention does not contemplate altering the hardness of the steel of which the band is made, but on the contrary achieves its purpose without affecting the metallurgical structure or hardness of the band, it follows that the steel band must be fully hardened and tempered to 40–50 Rc. before it is acted upon in the practice of this invention. The manner in which this is done forms no part of the present invention and hence may follow conventional practice.

The high speed steel wire on the other hand, being preferably unrolled from a spool during the process, must be in an annealed condition as it is fed into the arc. Preferably it is purchased in this condition from the manufacturer. Needless to say, as the high speed steel wire enters the arc and melts, it reaches, and in fact exceeds, the temperature required to harden high speed steel (2250° F.) and because of the rapidity with which the molten steel is quenched and solidified, the resulting bead is not only fully hardened to 63–66 Rc. as hereinbefore noted, but is given the desired fine grain structure. Being thus fully hardened and quenched it may be directly tempered to secondary red heat hardness without any further hardening. Thus, in one operation, two significant results are accomplished:

(1) A bead of high speed steel having an exceptionally fine grain structure free from any evidence of cold working, is fused to an edge of a band of steel already fully hardened to 40–50 Rc. and possessing all the properties necessary to withstand shock and have good resistance to fatigue failure, as well as flexibility needed to travel repeatedly over the band wheels or pulleys of a band saw without deleteriously affecting the band; and (2) The bead of high speed steel is heat-treated and

| SAE | Carbon | Manganese | Silicon | Chromium | Vanadium | Tungsten | Molybdenum | Cobalt | Iron |
|-----|--------|-----------|---------|----------|----------|----------|------------|--------|------|
| T-1 | 0.70 | 0.30 | 0.30 | 4.10 | 1.00 | 18.00 |  |  | Bal. |
| T-2 | 0.80 | 0.30 | 0.30 | 4.10 | 2.10 | 18.50 | 0.80 |  | Bal. |
| T-3 | 1.05 | 0.30 | 0.30 | 4.10 | 3.25 | 18.50 | 0.80 |  | Bal. |
| T-4 | 0.75 | 0.30 | 0.30 | 4.10 | 1.00 | 18.00 | 0.80 | 5.00 | Bal. |
| T-5 | 0.80 | 0.30 | 0.30 | 4.10 | 2.00 | 18.50 | 0.80 | 8.00 | Bal. |
| T-6 | 0.80 | 0.30 | 0.30 | 4.50 | 1.50 | 20.00 | 0.80 | 12.00 | Bal. |
| T-8 | 0.80 | 0.30 | 0.30 | 4.10 | 2.00 | 14.00 | 0.80 | 5.00 | Bal. |
| T-15 | 1.57 | 0.25 | 0.25 | 4.75 | 5.00 | 12.50 |  | 5.00 | Bal. |
| M-1 | 0.80 | 0.30 | 0.30 | 4.00 | 1.10 | 1.50 | 8.50 |  | Bal. |
| M-2 | 0.84 | 0.30 | 0.30 | 4.10 | 2.00 | 6.00 | 5.00 |  | Bal. |
| M-3 | 1.15 | 0.30 | 0.30 | 4.10 | 3.00 | 5.75 | 5.25 |  | Bal. |
| M-4 | 1.27 | 0.25 | 0.30 | 4.50 | 4.00 | 5.50 | 4.50 |  | Bal. |
| M-10 | 0.85 | 0.30 | 0.30 | 4.10 | 2.00 |  | 8.00 |  | Bal. |
| M-15 | 1.57 | 0.25 | 0.25 | 4.75 | 5.00 | 6.50 | 3.00 | 5.00 | Bal. |

Practically all of these different high speed steels can be used. M-2, M-3, M-4, T-8, T-15 and M-15 have been used, but most of the experimental work done has been with M-3 and M-4. With these steels, the bead, quenched to a hardness between 63–66 Rc. so that no subsequent heat treatment of the bead is needed, and instead the bead may be directly tempered to its secondary hardness.

Although an understanding of this invention no doubt may be gained without recourse to drawings, for convenience, the accompanying drawings have been provided, and in these:

FIGURE 1 is a diagrammatic view illustrating an apparatus that may be employed to fuse or weld cutting tool steel onto an edge of a steel band in a continuous operation;

FIGURE 2 is a view at a substantially larger scale of that portion of the apparatus by which the fusion of the cutting tool steel to the steel band is effected;

FIGURE 3 is a cross sectional view through FIGURE 2 on the plane of the line 3—3;

FIGURE 4 is a longitudinal sectional view through a muffle of the type that may be used to temper the cutting tool steel bead;

FIGURE 5 is a cross sectional view through FIGURE 4 on the plane of the line 5—5;

FIGURE 6 is a perspective view of a short length of the band saw blade stock, produced in accordance with this invention;

FIGURE 7 is a perspective view of a short length of finished band saw blade produced from the stock illustrated in FIGURE 6; and FIGURE 8 is a cross sectional view, on an exaggerated scale, through the cutting tool steel bead and the contiguous portion of the steel back.

Referring now particularly to the accompanying drawings, the numeral 5 designates the steel band onto one edge of which a bead 6 of high speed steel is to be fused. The steel of which the band 5 is made may be any one of the high carbon steels heretofore identified, but SAE 6150, with a hardness of 45 Rc. seems to be the best suited to the purpose. By means of drive rolls (not shown) between which the steel band 5 is gripped, the band is moved endwise between chill plates or quench jaws, designated generally by the numeral 7. As best seen in FIGURE 3, the quench jaws have steel outer plates 8 with copper inserts 9 between which the steel band slides as it passes. Coolant passages 10 in the copper inserts provide for the circulation of water to rapidly abstract heat from the inserts and hence from the steel band.

Mounted in the path of the advancing steel band, both upstream and downstream from the quench jaws, are rollers 11 and 12, or their equivalent, to ride upon the upper edge of the band in the one case, and the high speed steel bead 6 in the other, and midway between the rollers 11 and 12 is a bottom support 13 which bears against the lower edge of the steel band. Through vertical adjustment of the rollers 11 and 12 and the support 13, or the latter alone, effected in any suitable manner, the portion of the band spanning the top support rollers 11 and 12 is bowed edgewise to impart a predetermined convex curvature to the upper edge of the band.

Bowing the band in this manner stretches the top edge of the band and thereby effects the desired camber control and assures that the composite band will be straight when its heated edge and the cutting tool steel bead cools, as hereinbefore explained.

As also hereinbefore noted, in a specific adaptation of this invention, the top support rollers 11 and 12 were spaced apart four feet, and the adjustment of the relative positions of the three supports was such that an edgewise curvature or pre-camber was imparted to the band which measured one-half inch from the center of the arc to its chord.

Above the high point of the arc is a "Heliarc" type welding torch 14, having a tungsten electrode 15 protruding from a nozzle 16. The electrode is connected in the conventional manner with the ungrounded terminal of a source of welding current (not shown), and the nozzle 16 has argon or some other suitable inert gas fed to it, to issue from the nozzle and bathe the electrode 15 and the arc which is drawn between the electrode and the top edge of the steel band 5 as the band travels past the electrode, the band, of course, being connected with the grounded terminal of the voltage source, preferably through the quench jaws.

The gap between the electrode and the edge of the steel band must be adjustable, and to provide this adjustability, the nozzle 16 and the electrode holder may be slidably mounted in a bracket 17.

The arc drawn between the top edge of the steel band and the electrode 15, brings the contiguous edge portion of the steel band to its fusion temperature, and as it does so it also melts the end of a wire or rod 18 of the selected cutting tool steel which is fed into the side of the arc. Surface tension alone confines the molten steel, and by virtue of the endwise travel of the band, the molten puddle assumes a cylindrical shape fused to the edge of the band. For obvious reasons, the region of the arc is bathed in the argon or other inert gas issuing from the nozzle 16.

If the cutting tool steel is supplied in the form of wire, it will be unwound from a reel or roll thereof and drawn through a wire straightener 19 of any conventional type, by a set of feed rolls 20. The rolls 20 feed the wire through a flexible sheath 21, the end of which terminates in a nozzle 22 of copper or other suitable non-ferrous metal.

If rods are used rather than wire, the rods may be fed out of a suitable hopper, not shown.

The nozzle 22 is supported directly above the path of the steel band 5, the support being adjustable so that the angle between the wire and the adjacent top edge of the band may be varied between approximately five and fifteen degrees, and the discharge end of the nozzle may be raised and lowered. With proper adjustment of the nozzle 22, the protruding end portion of the cutting tool steel wire will be in direct vertical alignment with the band, and will enter the side of the arc at an angle of between five and fifteen degrees to the top edge of the band. Also, the protruding end portion of the wire will dip into or at least contact the molten "cylinder," as shown in FIGURE 2 as it enters the arc. Hence, by conduction, the wire is pre-heated and solidification of the molten steel is promoted.

It is important to maintain the volume of the molten metal as small as possible. To this end, only about one-sixteenth of an inch of the top edge portion of the band is exposed above the water-cooled quench jaws. If much more of the band edge is exposed, too much of the band edge will melt, and add objectionably to the volume of molten metal. This would make it difficult to solidify the molten portion of the bead before surface tension can cause it to "ball" and disrupt the continuity of the band.

On the other hand, if too little band edge is exposed, any slag which may form on top of the quench jaws will tend to push the molten portion of the bead around and will also draw the arc, depending upon the height of the slag formation, thereby causing erratic welding or fusion.

The spacing between the electrode and the top edge of the band, and the amperage of the welding current are also important. It has been found that this spacing and consequently the arc length, should be as short as possible. If the arc length is too long, or the current too high, the band will pre-melt too far upstream, thus producing a large volume of molten metal and increasing the possibility that surface tension will cause it to ball. A long arc also tends to spread the direct heat from the arc to the formed molten bead, and thereby delays solidification.

If the arc power or amperage is too high, it either burns the steel band too deeply, or causes the wire to melt in the same manner as it does when the wire feed is too slow. Under these circumstances, a ball will form on the molten end of the wire and will then run back up the wire and drop off. If this happens, a series of discreet balls or globs will be formed on the edge of the band instead of a continuous uniform diameter bead. On the other hand, if the arc power or amperage is too low, the advancing wire tends to push the arc upstream, causing the wire to feed under the arc more, and this in turn shields the band edge, causing a loss of edge pre-melt and, therefore, no welding.

From the foregoing observations, it is felt that anyone skilled in the art of welding will have no difficulty in making the necessary adjustments to obtain the result sought, and as a further guide the following exemplary data is given:

| | |
|---|---|
| Thickness of the band | Fifty-thousandths of an inch. |
| Width of the band | Two inches. |
| Material | SAE 6150. |
| Band speed | Four feet per minute. |
| Pre-camber | One-half inch in a chord four feet long. |
| Band edge exposed above quench jaws. | One-sixteenth inch at the point of the arc. |
| Length of arc | 3/16" (approximately). |
| Amperage of current fed to arc. | 70 amps. |
| High speed steel wire | .060φ M4. |
| Angle which wire forms to top edge of band. | 10°. |
| Rate of feed of wire | Three-quarters to twice the rate of band feed. |

Under these circumstances, there is no tendency for the molten puddle to ball, the bead of high speed steel will be uninterrupted, its diameter will be quite uniformly maintained at about seventy to one hundred-thousandths of an inch, and upon cooling the band will be straight.

FIGURES 4 and 5 illustrate a muffle that may be used to temper the high speed steel bead to secondary hardness. This muffle consists of a lower base section 26 and an upper cover section 27 hinged together along one side. Both sections are essentially formed of refractory material, suitably reinforced.

The base section 26 has a cooled channel-shaped metal track 28 extending from one end to the other thereof along which the steel band travels with only the high speed steel bead exposed. An elongated recess 29 in the cover section defines the interior of the muffle, and an electric heating element 30 of any suitable type lines the wall of the recess to supply the heat for the tempering operation performed in the muffle.

The track 28 along which the band rides, is provided with coolant passages through which water or other cooling fluid is circulated to abstract the heat from the band to prevent loss of its hardness; and so that the band may be bowed edgewise as it travels through the muffle for camber control, rollers 31 are mounted at the inlet and exit of the muffle in position to bear down upon the high speed steel bead, and a central bottom support 32 bears against the lower edge of the band. The rollers 31 and the support 32 are adjustable vertically to enable the attainment of any desired camber.

After the high speed steel bead has been tempered to obtain secondary hardness, the band saw blade stock is complete. At this juncture, it may be rolled up and put away for subsequent conversion into actual saw blade, such as that shown in FIGURE 7. To do this, simply requires grinding off the sides of the bead and then cutting or grinding teeth into the edge of the band through the high speed steel bead. This can be done with any conventional apparatus, but the amount of high speed steel left on the tooth tip should not exceed about one-half the total height of the tooth. If the high speed steel extends farther down into the tooth, setting of the teeth may result in breakage.

From the foregoing description taken with the accompanying drawings, it will be apparent to those skilled in the art, that this invention makes possible an entirely new approach to the problem of making good metal cutting band saw blades, in that it provides pitchless band saw blade stock, which may be stored by the manufacturer for subsequent conversion into band saw blades of any pitch or tooth style; and that by its adaptation to a continuous method of manufacture, the invention achieves an objective long sought by the industry.

Although the foregoing specification has been quite specific in its description of the invention, it should be understood that changes may be made therein without traveling outside the scope of the invention as set forth in the following claims.

What is claimed as our invention is:

1. Band saw blade stock comprising: a composite band consisting of: (1) a flexible band of steel possessing the properties necessary to withstand shock and have good resistance to fatigue failure, said band being of indiscriminate length, uniform width and thickness and being sufficiently flexible to be unaffected by repeated flexure over the pulleys of a band saw, and (2) a continuous unbroken bead of cutting tool steel fused directly to one edge of said flexible steel band with a well-defined junction therebetween extending across said edge of the band, the bead having a hardness in the 63–66 Rc. range so that it may be tempered to secondary hardness without any intermediate hardening, and having an exceptionally fine grain structure obtained as a result of rapid quenching from the molten state and being free from any evidence of cold working; the composite band being essentially free from internal stresses so that substantially no deformation thereof takes place when teeth are ground into said edge with the gullets of the teeth well below the junction of the flexible steel band and the bead thereon and only the tip portions of the teeth of cutting tool steel.

2. Band saw blade stock comprising: a composite band consisting of (1) a flexible band of steel which has been hardened and tempered to have the characteristics and properties of good spring steel so that it will withstand shock and have good resistance to fatigue failure, despite rapidly recurring flexure of the band; and (2) a continuous unbroken bead of cutting tool steel fused directly to one edge of said flexible steel band with a well-defined junction between the band and the bead extending across said edge of the band, the steel bead having a hardness in the 63–66 Rc. range so that it requires no further hardening preparatory to tempering to secondary hardness, and having an exceptionally fine grain structure resulting from rapid quenching from the molten state and being free from any evidence of cold working, and said bead being at least as wide as the thickness of the band and projecting beyond said edge of the band a distance greater but not more than twice the thickness of the band so that regardless of the size of the teeth that may be subsequently ground into the composite band with the tips thereof contiguous to the outer surface of the bead, the gullets of the teeth will lie well below the junction of the bead and the band and the tip portions thereof will be formed entirely of cutting tool steel; and the composite band being essentially free of internal stresses so that substantially no deformation thereof takes place when the teeth are ground therein.

3. A method of making composite band saw blade stock consisting of (1) a flexible steel band of substantially uniform width and thickness, the steel of which said band is made possessing the properties necessary to withstand shock and have good resistance to fatigue failure despite rapidly recurring flexure of the band, and (2) an unbroken continuous bead of cutting tool steel on one edge of said band, said method comprising: advancing a band of steel having the aforesaid properties lengthwise along a defined path through a heating zone; shielding all but a narrow edge portion of the band as it travels through said heating zone, against heat at said zone; heating the unshielded edge portion of the band to melt the surface thereof; feeding cutting tool steel into said heating zone in such relation to the molten surface of said unshielded edge portion of the band that upon being melted in said zone, the molten cutting tool steel is deposited on said molten surface of said edge portion of the band; melting the portion of the cutting tool steel in the heating zone to effect deposition of the cutting tool steel onto said edge portion of the band; so coordinating the temperature at the heating zone, the rate of travel of the band, and the rate at which the cutting tool steel is fed into the heating zone that the amount of molten metal on said edge of the band at any time is always sufficient to project beyond both sides of the band yet never exceeds the volume that can be reliably confined by the surface tension of the molten metal; and abstracting heat from the shielded portion of the band to (1) quickly carry off heat conducted to the band by the molten metal on its unshielded edge portion and thereby rapidly quench the cutting tool steel to full hardness as the molten metal solidifies into a bead which projects beyond both sides of the band so that the bead requires no further heat treatment preparatory to being tempered to secondary hardness, and (2) to assure against the loss of hardness and change in the metallurgical structure of the steel of the band.

4. The method of claim 3 wherein the coordination of the rate of travel of the band and the rate at which the cutting tool steel is fed to the heating zone is such that the bead of cutting tool steel fused to the edge of the band is substantially round in cross section and has a diameter greater but not more than twice the thickness of the band.

5. The method of claim 3, wherein the band is moved substantially horizontally through the heating zone with its unshielded edge facing upwardly; and wherein the cutting tool steel is fed into said zone in the form of a wire or rod moving lengthwise along a path which overlies the just-formed part of the bead at an acute angle thereto, so that the wire or rod protects the just-formed part of the bead from the heat at the heating zone.

6. The method of claim 5, further characterized by so controlling the path along which the wire or rod of cutting tool steel is fed into the arc that the wire or rod contacts the molten portion of the bead before it enters the arc.

7. The method of claim 3 further characterized by bowing the band edgewise as it passes through the heating zone to impart a convex curvature to the unshielded edge of the band so as to stretch the same whereby the composite band will be straight and substantially free from internal stresses when its heated edge and the cutting tool steel bead thereon are cool.

8. A method of making bi-metal band stock consisting of (1) a flexible steel band of indiscriminate length and substantially uniform width and thickness, the steel of which said band is made being hardened and tempered to have the characteristics and properties of good spring steel so that the band will withstand shock and have good resistance to fatigue failure despite rapidly recurring flexure thereof, and (2) an unbroken continuous bead of cutting tool steel on one edge of the band, said method comprising: moving a band of steel having the aforesaid characteristics and properties lengthwise past an electrode with one edge of the band closer to the end of the electrode than any other portion of the band; producing and maintaining an electric arc between the end of the electrode and the adjacent edge portion of the band to melt the latter as it passes; feeding cutting tool steel into the arc and thereby melting and depositing said cutting tool steel on the molten edge of the band with the molten metal unsupported except by its surface tension; so coordinating the rate of travel of the band with the rate at which the cutting tool steel is fed into the arc and melted thereby that the cutting tool steel is deposited in a bead which is substantially round in cross section and has a diameter greater than the thickness of the band but no more than twice the thickness thereof, so that the surface tension film of the molten metal is strong enough to support and hold the unsolidified portion of the bead against rolling off the edge of the band, and the bead projects to both sides of the band; and cooling all but said edge portion of the band as the band travels past the electrode to protect the band against loss of hardness and change in its metallurgical properties and to abstract heat from the molten metal and solidify the same before surface tension can cause the molten metal to ball up and disrupt the continuity of the bead being formed on the band, and at the same time quench the cutting tool steel to full hardness which obviates further hardening thereof preparatory to tempering to secondary hardness.

9. The method of claim 8, further characterized by bowing the band edgewise as it passes the electrode to impart convex curvature to its heated edge and stretch the same whereby the composite band will be free from objectionable camber when its heated edge and the bead thereon are cool.

10. The method of claim 8, further characterized by tempering the steel bead to secondary hardness.

11. The method of claim 8, further characterized by the step of simultaneously heating the steel bead to a temperature necessary to bring about secondary hardness therein, and abstracting heat from the band at a rate sufficient to preclude loss of hardness of the band.

12. The method of claim 9, further characterized by moving the band with its bead thereon lengthwise through a heated muffle, the temperature of which is that required to temper the steel bead to secondary hardness; and shielding all portions of the band inwardly of its junction with the bead against the heat obtaining in the muffle, to thus preclude loss of hardness in the band.

13. The method of claim 12, further characterized by positively imparting camber to the band as it travels through the muffle to stretch the bead and the contiguous edge portion of the band.

14. A method of making composite band saw blade stock consisting of
A. a flexible steel band of substantially uniform width and thickness, the steel of which said band is made possessing the properties necessary to withstand shock and have good resistance to fatigue failure, despite rapidly recurring flexure of the band, and
B. an unbroken continuous strip of cutting tool steel on one edge of said band, said method comprising:
(1) advancing a band of steel having the aforesaid properties lengthwise along a defined path through a heating zone;
(2) bowing the band edgewise as it passes through the heating zone to thereby impart a convex curvature to one edge of that portion of the band in the heating zone;
(3) shielding substantially all but the convexly curved edge portion of the band as it travels through said heating zone, against heat at said zone;
(4) feeding a wire of annealed cutting tool steel endwise into the heating zone along a path which lies in the plane of the band and intersects the convexly curved edge of the band at an acute angle;
(5) heating a localized section of the unshielded edge portion of the band at the point the path of the wire intersects said edge to melt the surface thereof;
(6) heating the wire in the heating zone to above its critical hardening temperature throughout the entire cross section of the wire, and to melt the portion of the wire contiguous to the molten edge of the band whereby the contiguous portions of the wire and band edge are fused together;

(7) and abstracting heat from the shielded portion of the band to
- (a) quickly carry off heat conducted to the band by the molten contiguous portions of the wire and band edge and by the unshielded edge portion of the band and thereby rapidly quench the cutting tool steel fused to the band to full hardness, so that it requires no further heat treatment preparatory to being tempered to secondary hardness, and
- (b) to assure against loss of hardness and changes in metallurgical structure of the steel of the band.

References Cited in the file of this patent

UNITED STATES PATENTS

| | | |
|---|---|---|
| 1,241,900 | Armstrong | Oct. 2, 1917 |
| 1,535,096 | Blum | April 28, 1925 |
| 1,919,358 | Bem | July 25, 1933 |
| 2,175,607 | Kinkead | Oct. 10, 1939 |
| 2,250,561 | Wissler | July 29, 1941 |
| 2,299,778 | Wissler | Oct. 27, 1942 |
| 2,847,555 | Yenni | Aug. 12, 1958 |
| 2,938,993 | Rudd | May 31, 1960 |
| 3,034,378 | Anderson | May 15, 1962 |
| 3,034,379 | Bernstein et al. | May 15, 1962 |

FOREIGN PATENTS

| | | |
|---|---|---|
| 400,565 | Great Britain | Oct. 26, 1933 |